United States Patent [19]

Hermann et al.

[11] Patent Number: 4,600,655

[45] Date of Patent: Jul. 15, 1986

[54] PLASTICIZED THERMOPLASTIC POLYVINYLBUTYRAL MOLDING COMPOSITIONS HAVING REDUCED ADHESION TO GLASS

[75] Inventors: Hans D. Hermann; Kurt Fock, both of Bad Soden am Taunus; Klaus Fabian, Kriftel; Joachim Ebigt, Frankfurt am Main, all of Fed. Rep. of Germany

[73] Assignee: Hoechst Aktiengesellschaft, Fed. Rep. of Germany

[21] Appl. No.: 732,732

[22] Filed: May 10, 1985

[30] Foreign Application Priority Data

May 12, 1984 [DE] Fed. Rep. of Germany ....... 3417653

[51] Int. Cl.$^4$ .................. C08L 29/14; C08K 5/14; C08J 3/20; B32B 17/06
[52] U.S. Cl. ................... 428/437; 428/428; 524/156; 524/503
[58] Field of Search ............... 428/437, 428; 524/156, 524/503

[56] References Cited

U.S. PATENT DOCUMENTS

| | | | |
|---|---|---|---|
| 4,161,565 | 7/1979 | Hermann et al. | 428/437 |
| 4,180,620 | 12/1979 | Inskip | 428/437 |
| 4,205,146 | 5/1980 | Hermann et al. | 428/437 |
| 4,341,674 | 7/1982 | Vermilion et al. | 524/156 |
| 4,361,625 | 11/1982 | Beckmann et al. | 428/437 |
| 4,371,586 | 2/1983 | Dages | 428/437 |
| 4,386,183 | 5/1983 | Wempe | 524/156 |
| 4,499,236 | 2/1985 | Hermann et al. | 525/58 |
| 4,533,601 | 8/1985 | Hermann et al. | 524/503 |
| 4,537,830 | 8/1985 | Hermann et al. | 428/437 |

FOREIGN PATENT DOCUMENTS

| | | | |
|---|---|---|---|
| 1289261 | 10/1969 | Fed. Rep. of Germany . | |
| 2646280 | 4/1978 | Fed. Rep. of Germany . | |
| 2732717 | 6/1980 | Fed. Rep. of Germany . | |
| 3038449 | 6/1982 | Fed. Rep. of Germany . | |
| 0041647 | 3/1977 | Japan | 524/156 |
| 0190844 | 11/1983 | Japan | 428/437 |
| 1093864 | 12/1967 | United Kingdom . | |

*Primary Examiner*—Herbert J. Lilling
*Attorney, Agent, or Firm*—Berman, Aisenberg & Platt

[57] ABSTRACT

Reduction in the adhesion to glass of thermoplastic, plasticized polyvinylbutyral molding compositions, in particular sheeting, by adding the magnesium salt of sulfonic acids or sulfuric acid half-esters or mixtures of these compounds as an non-stick agent, preferably in amounts of 0.003 to 0.3% by weight, relative to the plasticized polyvinylbutyral. The non-stick agent is preferably employed in the form of a solution in the plasticizer. The use of the sheeting having an adhesion to glass reduced in accordance with the invention as the laminating layer for the production of glass laminates.

12 Claims, No Drawings

PLASTICIZED THERMOPLASTIC POLYVINYLBUTYRAL MOLDING COMPOSITIONS HAVING REDUCED ADHESION TO GLASS

The invention relates to thermoplastic, plasticized polyvinylbutyral molding compositions, particularly sheeting, which have reduced adhesion to glass and which contain, as a non-stick agent, the magnesium salt of a sulfonic acid or of a sulfuric acid half-ester or mixtures of these compounds, to a process for their preparation and to their use for the production of glass laminates.

Laminated glass consists of two or more sheets of glass held together by plastic sheeting. The intermediate plastic layer ensures that the laminated sheet is not perforated in the event of an impact and that no glass splinters fly off in this impact.

The sheeting must have a totally defined adhesion to the glass in order to be able to fulfil this task. If this adhesion is too high, the glass does not separate at all from the sheeting under the action of the impact; instead, the sheeting is immediately overstretched and tears at the crack in the glass. If the adhesion is too low, glass splinters separate from the glass sheet. Only at the correct adhesion to the glass does the sheeting separate slightly at the crack in the glass, so that it cannot become overstretched and can absorb the impact in an elastic manner, without glass splinters flying off from the laminate.

Plasticized polyvinylbutyral sheeting has proved itself suitable as an intermediate layer for laminated glass for a long time. It is known to reduce in a defined manner the adhesion of polyvinylbutyral to glass, which is normally too high. This is effected most easily by the addition of water. However, in the case of strongly adhering sheeting the water content must be so high (>0.8% by weight) that it can lead to the formation of bubbles in the laminate.

It is also known to adjust the adhesion to the glass by adding salts of various alkali metals, alkanline earth metals and other metals. Potassium compounds having an alkanline reaction, such as potassium hydroxide and potassium acetate, or potassium salts such as are described, for example, in German Pat. No. 1,289,261 have proved particularly suitable for reducing the adhesion to the glass.

Magnesium salts of monocarboxylic and dicarboxylic acids are also mentioned frequently as non-stick agents. Thus magnesium salts of various carboxylic acids are mentioned in U.S. Pat. Nos. 3,249,487 and 3,249,490.

Other good non-stick agents are betaines, such as are described, for example, in German Offenlegungsschrift No. 2,646,280, and also other compounds having a betaine structure.

In some cases the compounds mentioned are very suitable for selectively reducing the adhesion to glass of plasticized polyvinylbutyral sheeting and thus for increasing the impact resistance of glass laminates made from these types of sheeting.

However, the non-stick agents mentioned cannot yet give satisfaction in every respect. For instance betaines and lecithin are not completely stable under more severe processing conditions. The highly effective potassium and magnesium salts are basic, which again can lead to impairment of the properties of the sheeting and to discolorations under more severe processing conditions. In addition, it is a factor common to all the non-stick agents mentioned that they are not easy to disperse uniformly in the polymer/plasticizer mixture. The most advantageous way to effect this is to allow the non-stick agent to dry on the polyvinylbutyral from an aqueous solution. However, it is also possible in accordance with the state of the art to treat the finished sheeting or the glass with a solution of non-stick agent before the production of the laminated glass. The addition of a solution of the non-stick agent to the plasticizer has also already been described. However, the non-stick agent generally separates out from the plasticizer. An unstable suspension is formed which in most cases can only be used for a short time.

The aim of the work which has led to the present invention was, therefore, to find non-stick agents which are not basic and which also include various types which either dissolve in the required concentration in the plasticizer without further treatment or can be added as a solution to the plasticizer, without separation of the non-stick agent taking place.

It has now been found, surprisingly, that magnesium salts of sulfonic acids or of half-esters of sulfuric acid are excellently suitable for use as non-stick agents for plasticized polyvinylbutyral sheeting. Since these salts, in contrast with the best non-stick agents hitherto disclosed, are not basic, they do not impair the properties of the polyvinylbutyral sheeting even under more severe processing conditions.

The invention relates, therefore, to a process for reducing the adhesion to glass of thermoplastic, plasticized polyvinylbutyral molding compositions by mixing the ingredients of the molding composition with a non-stick agent belonging to the group of magnesium salts, which comprises employing, as the non-stick agent, the magnesium salt of a sulfonic acid or of a sulfuric acid half-ester or mixtures of these compounds.

The thermosplastic, plasticized polyvinylbutyral molding composition can preferably be sheeting.

The invention also relates, therefore, to thermoplastic, plasticized polyvinylbutyral sheeting having an adhesion to glass reduced in accordance with the invention, to the use thereof for the production of glass laminates, and also to glass laminates containing, as the laminating layer, thermoplastic, plasticized polyvinylbutyral sheeting having an adhesion to glass reduced in accordance with the invention.

In many cases, and at least in the presence of a solvent or solubilizing agent, the non-stick agents according to the invention can be combined with the plasticizer to form a clear solution which remains stable for a prolonged period.

In principle, the magnesium salts of all sulfonic acids or sulfuric acid half-esters are suitable for use as non-stick agents. The magnesium salts of sulfonic acids are preferred.

Preferred non-stick agents are the magnesium salts of aliphatic, aromatic and cycloaliphatic sulfonic acids, for example, in particular, those of benzenesulfonic, toluenesulfonic, o-chlorobenzenesulfonic, naphthalenesulfonic, cyclohexanesulfonic and ethanesulfonic acids. The magnesium salts of sulfuric acid half-esters of aliphatic alcohols are also preferred.

The magnesium salts of sulfonic acids containing fairly long-chain, linear or branched, aliphatic radicals preferably having 6 to 30 carbon atoms, such as, for example, hexanesulfonic, dodecanesulfonic and octadecane sulfonic acids, are also preferred non-stick agents. The magnesium salt of dodecylbenzenesulfonic acid is particularly preferred. The preferred representatives of this class of sustances correspond to the general formula

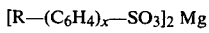

in which R denotes ($C_6$–$C_{30}$)-alkyl and x denotes 0 or 1.

Other preferred non-stick agents are the magnesium salts of the sulfuric acid half-esters of long-chain alcohols, such as, for example, isotridecyl alcohol, or of the sulfuric acid half-esters of ethoxylation products of such long-chain alcohols or of substituted phenols containing a long-chain, aliphatic radical preferably having 6–18 carbon atoms. The preferred representatives of this class of substances correspond to the general formula

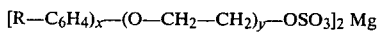

in which R denotes ($C_6$–$C_{18}$)-alkyl, x denotes 0 or 1 and y denotes 0 to 5.

The concentration of non-stick agent required in the polyvinylbutyral is variable and depends, in accordance with the invention, on the nature of the polyvinylbutyral, in particular on the content of vinyl alcohol units in the latter, and also on the nature of the plasticizer employed as well as the quality of the glass used. In general, the concentrations are preferably between 0.003 and 0.3% by weight, relative to the plasticized polyvinylbutyral. It is particularly preferable to employ concentrations of non-stick agent of between 0.01 and 0.2% by weight.

In principle, it is possible to use as the polymer any polyvinylbutyral which is suitable for the production of lamination sheeting. Examples of these are polyvinylbutyrals containing 15 to 28% by weight, preferably 16 to 24% by weight, of vinyl alcohol units, and preferably containing 1 to 3% by weight of vinyl acetate units, relative to polyvinylbutyral in each case. The polyvinylbutyral can be prepared in any desired manner, for example by the process of German Pat. No. 2,732,717.

The viscosity of the polymers used is within the customary range. Polyvinylbutyrals having a viscosity of between 30 and 200 mPa.s at 23° C. in a 5% strength by weight ethanolic solution (determined as specified in DIN 53,015) are particularly suitable.

The non-stick agents can be mixed with the polymer or the polymer/plasticizer mixture in any desired manner, before or during processing.

Various non-stick agents according to the invention can be incorporated into the plasticizer very easily. In so doing, it can be advantageous to dissolve the magnesium salt in a suitable solvent, for example an alcohol, such as, for example, methanol, a ketone, such as, for example, acetone, an ester, such as, for example, ethyl acetate, or an ether, such as, for example, dibutyl ether, and to add the solution to the plasticizer.

When the solution of non-stick agent has been added, the solvent is in most cases present in the polymer/plasticizer mixture in such a low concentration that it does not adversely affect the properties of the sheeting. However, it can also be removed by evaporation or degassing before or during the processing of the mixture of sheeting components to form the sheeting.

The plasticizer components used are those known from the state of the art. It is preferable to use plasticizers which, under the conditions which have to be maintained, are compatible with the polymers to be used in accordance with the invention. Thus for polymers containing up to approx. 21–22% by weight of vinyl alcohol units in the structure, it is possible to use, for example, esters of diethylene, triethylene and tetraethylene glycol with aliphatic, linear or branched carboxylic acids having 5–10 carbon atoms or esters of phthalic acid with alcohols having 4–10 carbon atoms. In the case of polymers containing higher proportions of vinyl alcohol units, it can be advantageous to employ phosphoric acid esters mixed with the said plasticizers, in order to improve the compatibility.

The esters mentioned of triethylene glycol are particularly preferred.

In addition, it is also possible to use other plasticizers, such as, for example, adipic and sebacic acid esters and phosphoric acid esters, on their own or as mixtures.

The concentration of plasticizer in the polymer/plasticizer mixture can be between 20 and 40% by weight, preferably between 25 and 35% by weight. Plasticizer concentrations of 27–32% by weight are particularly preferred. If the plasticizer concentrations are too low, the processability of the mixtures can be adversely affected, while if the plasticizer concentration is too high the strength required in the sheeting is often no longer achieved.

In addition to the non-stick agents claimed, the polymer/plasticizer mixture can also contain other non-stick agents, such as the known potassium or magnesium salts and betaines and lecithin, and also further customary additives, such as, for example, stabilizers and anti-blocking agents, in customary concentrations, for example between 0.01 and 1% by weight, relative to the mixture.

The polymer, plasticizer and additives can be processed in a known manner on a calender or in an extruder to give sheeting, preferably 0.3–1.5 mm thick.

The finished glass-lamination sheeting is converted into the laminate in a customary manner with sheets of glass, if appropriate after conditioning, which is necessary in order to adjust the water content of the sheeting to approx. 0.2–0.8% by weight. The adjustment of the water content is desirable because it also lowers the adhesion to the glass. In order to prevent the formation of bubbles during processing, the water concentration indicated should preferably not be exceeded.

In the production of a glass laminate, the sheeting is, for example, placed between sheets of glass 1 to 3 mm thick and compressed at 60°–100° C. to give a pre-laminate. The final laminate is produced from the latter, for example in an autoclave at 120°–160° C. and 8–16 bar. In the tests described in the examples below, the glass sheets were washed with demineralized water before the production of the laminates.

The quality of the glass laminate can be tested by subjecting it to a comprehensive program of tests.

The so-called pummel test is frequently used to assess the quality of the laminate, especially the adhesion to glass. In this test a glass laminate is cooled to −18° C., placed on a metal support and shattered by means of a hammer weighing 500 g. The laminate is assessed by means of pummel values between 0 (no adhesion) and 10 (complete adhesion) in accordance with the amount of glass which detaches itself from the sheeting in this test. A description of the test is to be found in British Pat. No. 1,093,846.

The adhesion to the glass can be determined very well by means of a shear test, which is described in German Offenlegungsschrift No. 3,038,449. In the measurements carried out in the examples below, laminated strips composed of float glass 3 mm thick, washed with demineralized water, and polyvinylbutyral sheeting of the thickness indicated in the examples are used. The dimensions of the strips are approx. 100×15 mm; the laminated area to be sheared, which is measured accurately before every tensile test, has dimensions of approx. 15×7 mm.

The laminated strips are ruptured at a rate of 20 cm/minute in a commercially available device made by Instron.

The optimum shear strength, adjustment of which results in impact-resistant glass laminates, is generally between 1.5 and 5 N/mm², preferably between 2 and 4 N/mm². A particularly preferred range is between 2.5 and 3.5 N/mm². High-strength sheeting can, without detriment, have somewhat higher shear strength values than sheeting of lower strength. This at the same time reduces the risk of the glass splintering when it is fractured.

The most important test method in practice is the falling ball test specified in DIN 52,306 (dynamic method). For this test, glass laminates measuring approx. 30×30 cm are produced from two sheets of float glass 3 mm thick and plasticized polyvinylbutyral sheeting approx. 0.8 mm thick. The average fracture height of the laminates, i.e., the height at which half of the sheets tested are broken, is determined using a steel ball weighing 2.26 kg.

The invention is illustrated in greater detail by means of the following examples:

EXAMPLE 1

A polyvinylbutyral/plasticizer mixture composed of: 71.0% by weight of polyvinylbutyral containing 20.7% by weight of vinyl alcohol units and having a viscosity of 71 mPa.s at 23° C. in a 5% strength by weight solution in ethanol, 28.45% by weight of triethylene glycol bisheptanoate, 0.05% by weight of magnesium pentadecylsulfonate and 0.5% by weight of methanol is prepared as follows:

The magnesium salt is first dissolved in methanol, the resulting solution is mixed with the plasticizer, and the polyvinylbutyral is added. The mixture is then intimately mixed. Extruded sheeting 0.8 mm thick is then produced from the resulting mixture in a customary manner. Laminates produced from 2 sheets of float glass 3 mm thick and this sheeting have the following properties:

Shear strength = 2.8 N/mm², pummel test = 5, and average fracture height = 6.9 m. Sheeting composed of the same components, but without the non-stick agent component, has a shear strength of 7.3 N/mm², a pummel test of 10 and an average fracture height of 3.6 m.

EXAMPLE 2

0.1% by weight of Mg dodecylbenzenesulfonate (relative to the mixture of polymer and plasticizer) is allowed to dry, from a 2% strength by weight solution in water, onto the polymer described in Example 1. The plasticizer employed is a mixture of 8 parts by weight of dioctylphthalate and 2 parts by weight of trioctylphosphate. Extruded sheeting 0.8 mm thick and containing 29.5% by weight of plasticizer is produced from this mixture as described in Example 1. Glass laminates produced therefrom analogously to Example 1 have an average fracture height of 7.1 m.

EXAMPLE 3

0.02% by weight (relative to the polymer/plasticizer mixture) of Mg dodecylbenzenesulfonate is dissolved by heating in triethylene glycol bis-2-ethylbutyrate. 29 parts by weight of this plasticizer solution are processed together with 71 parts by weight of the polyvinylbutyral described in Example 1 to give extruded sheeting 0.8 mm thick, the extrusion temperature during the production of the sheeting being raised to 230° C. The shear strength of a glass laminate made from this sheeting is reduced from 5.7 to 3.7 N/mm² by the addition of the non-stick agent, while the mechanical properties of the sheeting, in particular its tensile strength, are not impaired by the addition of the non-stick agent.

EXAMPLE 4

The following polyvinylbutyral/plasticizer mixture is prepared as described in Example 1, with the following composition:

72.0% by weight of polyvinylbutyral containing 20.1% by weight of vinyl alcohol units and having a viscosity of 80 mPa.s at 23° C. in a 5% strength by weight solution in ethanol, 0.04% by weight of $Mg[C_{12}H_{25}—(OCH_2—CH_2)_3—OSO_3]_2$, 0.36% by weight of ethanol and 27.6% by wieght of triethylene glycol bis-2-ethylbutyrate.

Sheeting produced from the mixture gives glass laminates which are clear and not discolored and which have an average fracture height of 6.9 m in the falling ball test.

EXAMPLE 5

2 g of a 5% strength solution of Mg dodecylbenzenesulfonate in methanol are added to 100 g of triethylene glycol bis-2-ethylutyrate. After a storage time of 20 days at 40° C., this solution is completely clear, and its effectiveness as a non-stick agent if unchanged.

If, for comparison, the magnesium salt according to the invention is replaced by the known non-stick agent, potassium formate, separation from the plasticizer takes place even after a short time, and the effectiveness of the mixture as an non-stick agent is reduced.

We claim:

1. A process for reducing adhesion to glass of a thermoplastic, plasticized polyvinylbutyral molding composition which comprises mixing constituents of the molding composition with a magnesium-salt non-stick agent and wherein the non-stick agent is a magnesium salt of a sulfonic acid, of a sulfuric acid halfester or of a mixture of such compounds.

2. A process as claimed in claim 1, wherein the magnesium salt is in an amount of from 0.003 to 0.3% by weight, relative to the plasticized polyvinylbutyral.

3. A process as claimed in claim 1, wherein the non-stick agent is in the form of a solution in plasticizer.

4. A process as claimed in claim 1, wherein the magnesium salt is in admixture with one or more other non-stick agents.

5. A process as claimed in claim 1, wherein the molding composition is sheeting.

6. Plasticized polyvinylbutyral sheeting having a reduced adhesion to glass and produced as claimed in claim 5.

7. A process as claimed in claim 3, wherein the solution comprises further solvent.

8. A process as claimed in claim 7, wherein the solution comprises solubilizer.

9. A process as claimed in claim 3, wherein the solution comprises solubilizer.

10. A process as claimed in claim 4, wherein the magnesium salt is in admixture with one or more other non-stick agents and with one or more further additives.

11. In producing a glass laminate with polyvinylbutyral sheeting, the improvement wherein the polyvinylbutyral sheeting is plasticized polyvinylbutyral sheeting having a reduced adhesion to glass as claimed in claim 6.

12. A glass laminate having a laminating layer and containing plasticized polyvinylbutyral sheeting as claimed in claim 6 as the laminating layer.

* * * * *